Patented Aug. 24, 1943

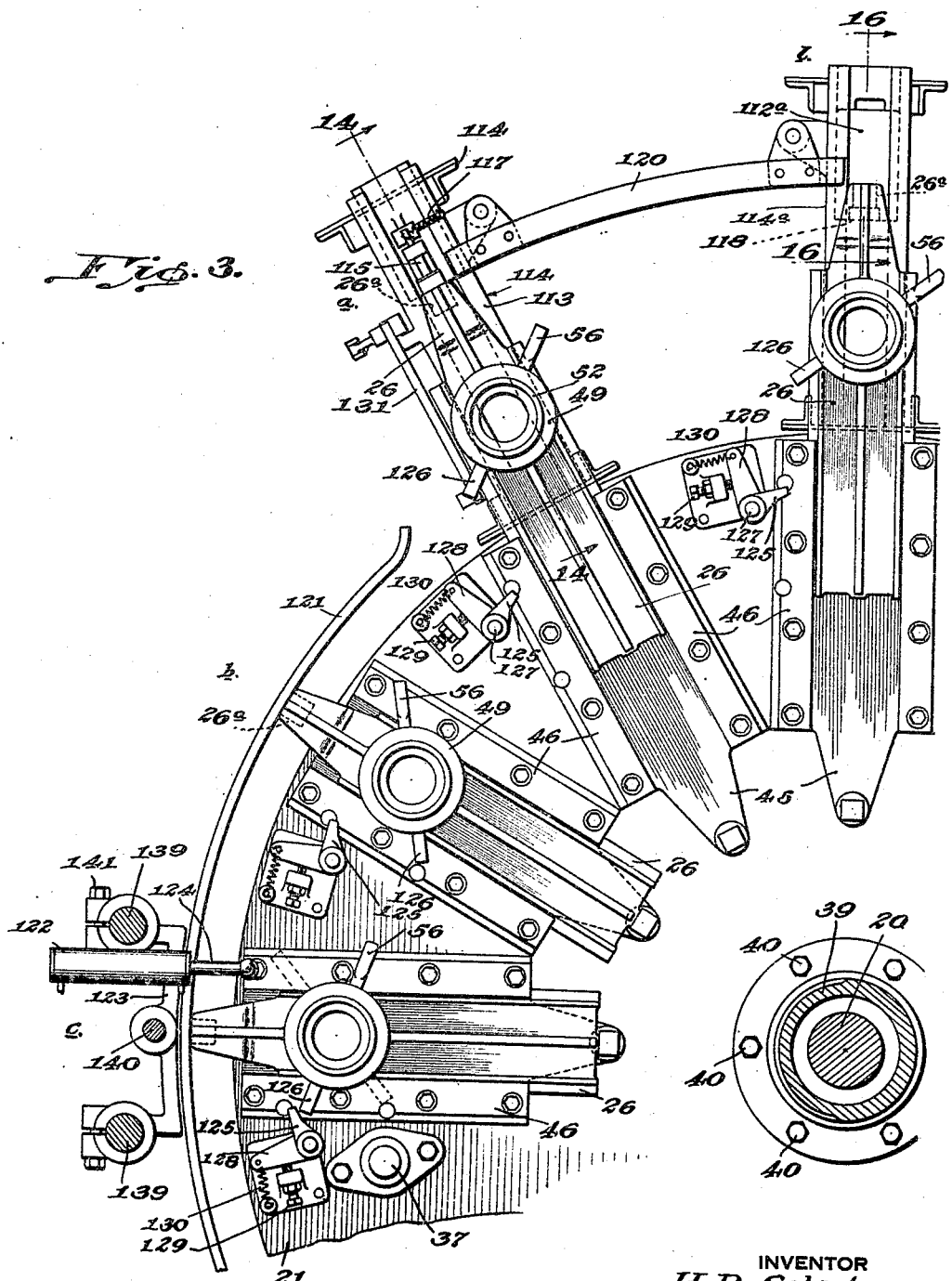

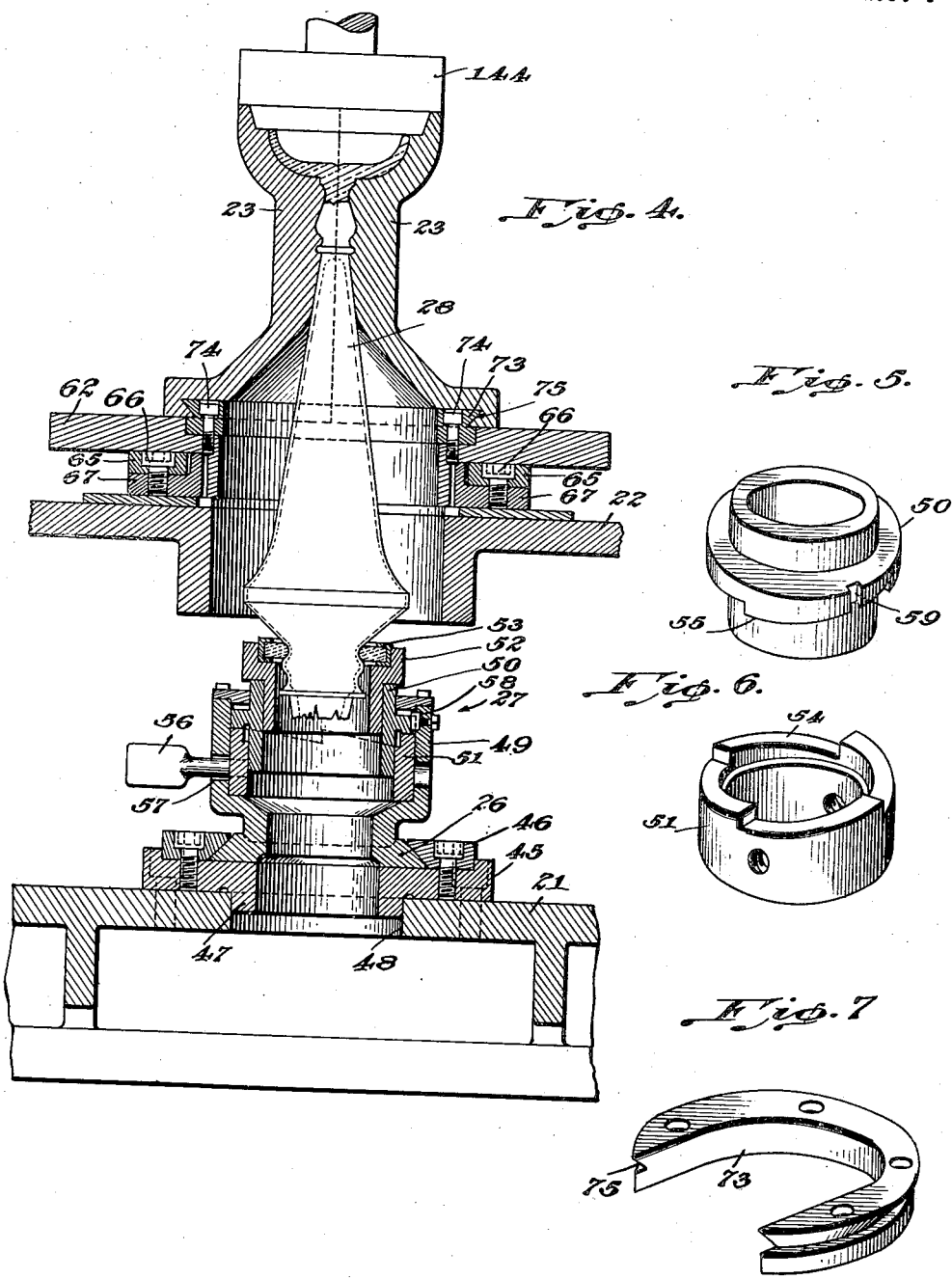

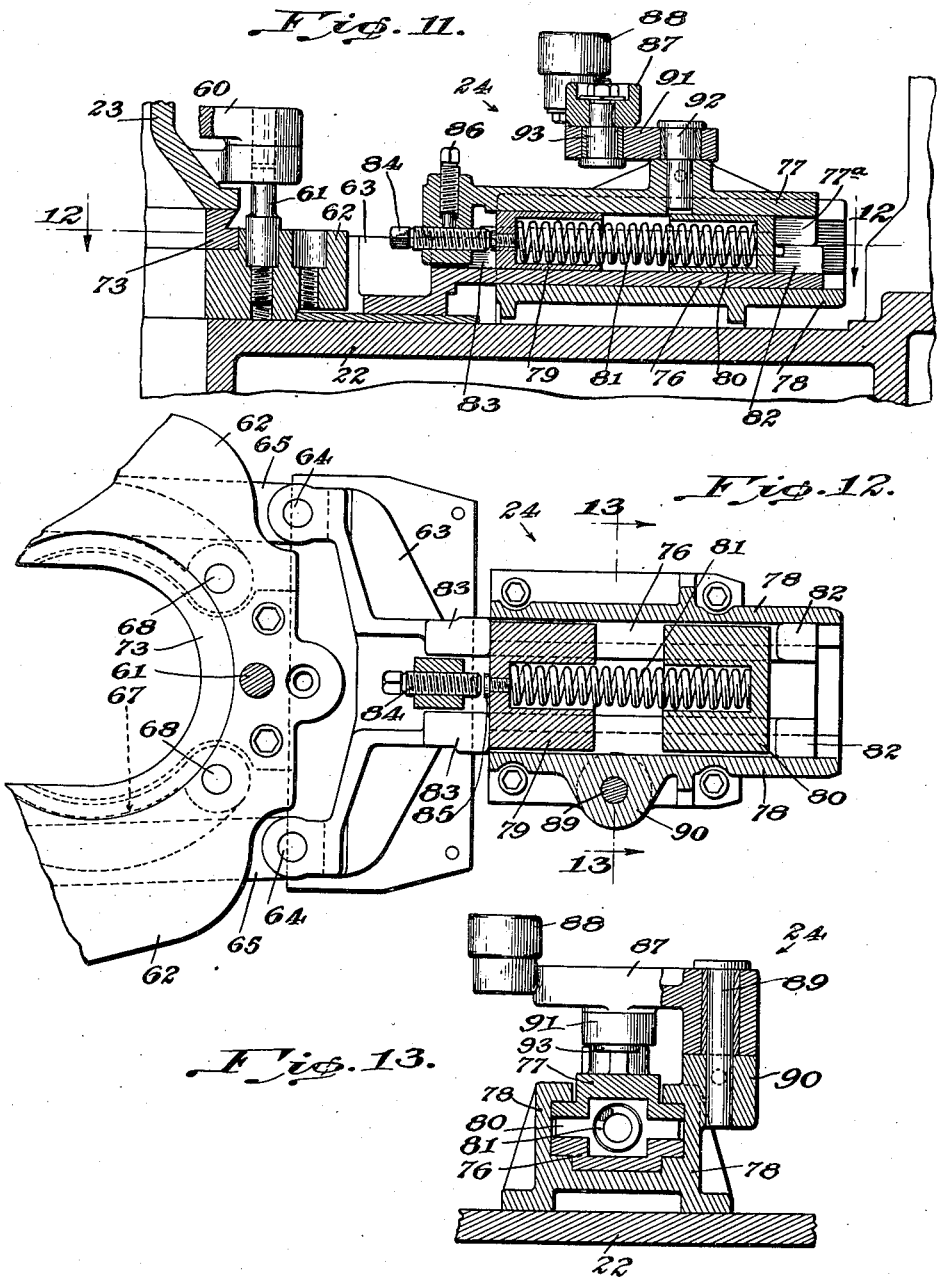

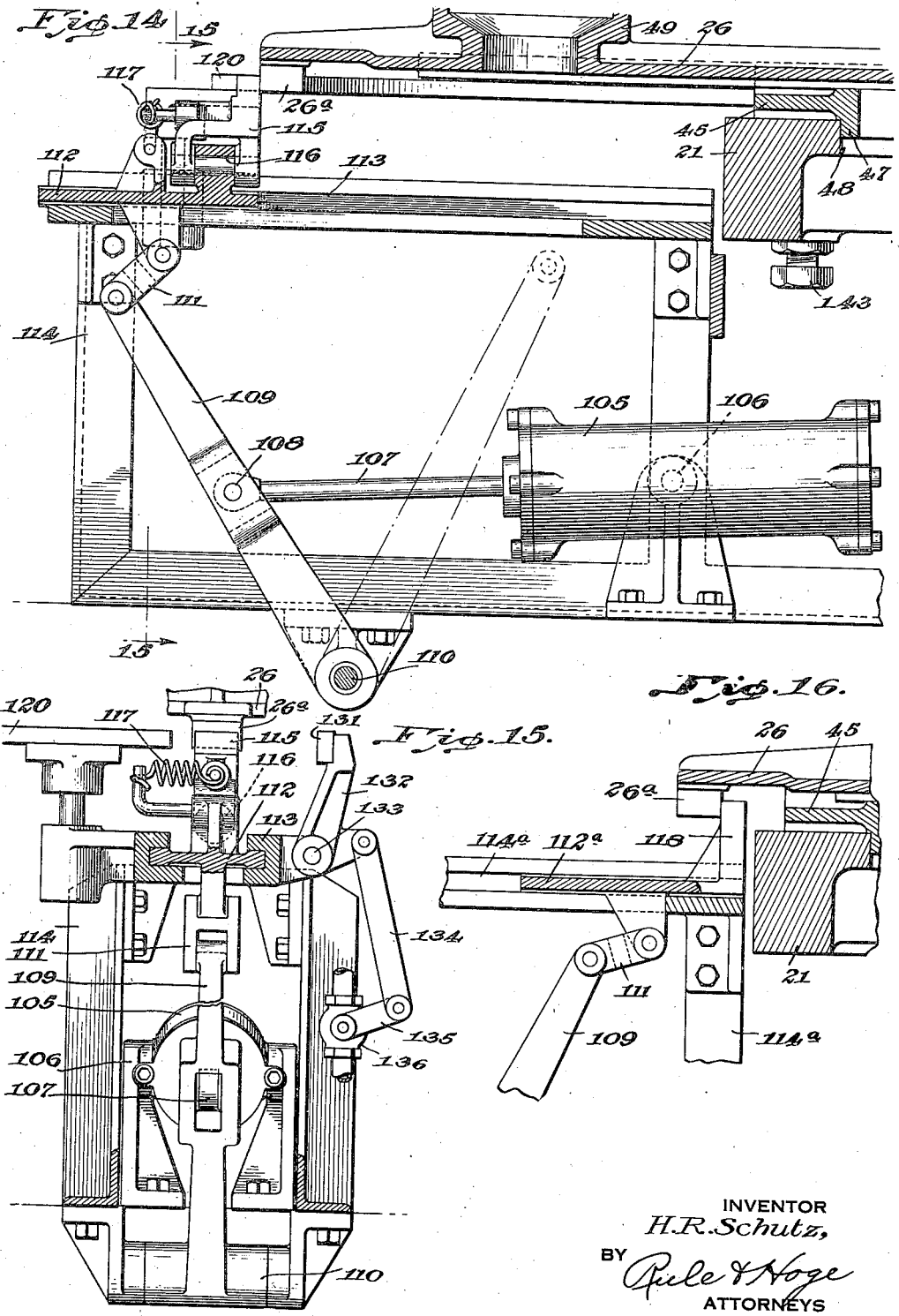

2,327,825

UNITED STATES PATENT OFFICE 2,327,825

APPARATUS FOR MAKING GLASSWARE

Harold R. Schutz, Toledo, Ohio, assignor to Libbey Glass Company, a corporation of Ohio Application March 29, 1940, Serial No. 326,635

9 Claims. (Cl. 49—37)

My invention relates to a method and apparatus adapted for use in the manufacture of glass articles and in its preferred form as herein illustrated the apparatus is designed for performing certain operations in the manufacture of stemware. It comprises a machine for molding a stem with a foot thereon and attaching the stem by a pressing operation to a pre-blown bowl. Other operations, not a part of the present invention, may follow for finishing the article.

An object of the invention is to provide a machine which is adapted for automatically effecting various operations which heretofore have commonly been done by hand in the manufacture of stemware and the like.

The invention in its preferred form comprises a main work table for supporting the bowls to which the stems are to be attached, means for rotating the table step by step, a mold table and press molds thereon above the work table, and means for elevating the bowls into position relative to the press molds for the attachment of the stems thereto.

Referring to the accompanying drawings which illustrate a machine embodying the principles of my invention:

Fig. 3 is a section at the line 3—3 on Fig. 1;

Fig. 4 is a vertical section at the line 4—4 on Fig. 1;

Figs. 5 and 6 are perspective views respectively of the upper and lower sections of the elevator by which a bowl is positioned within the press mold;

Fig. 7 is a perspective view of a centering and holding device for the press mold sections;

Figure 8:
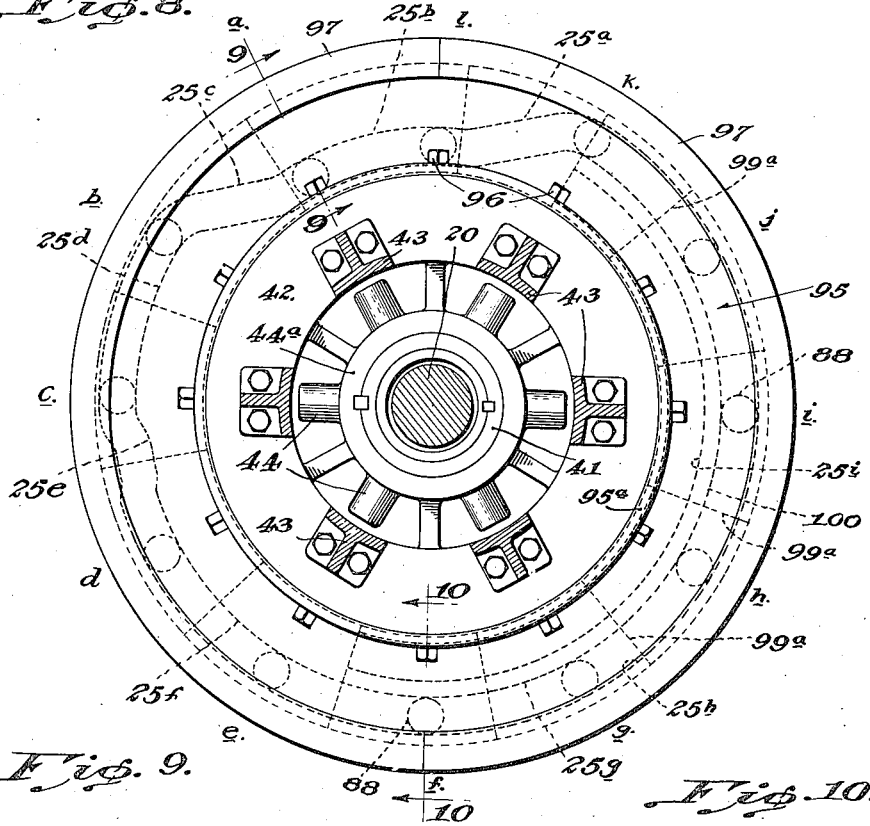
Fig. 8 is a section at the line 8—8 on Fig. 1 showing particularly the mold opening and closing cam.
Figures 9, 10:
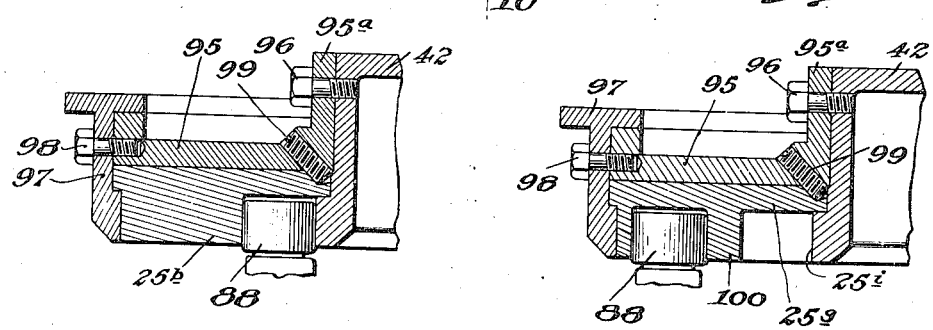

Figs. 9 and 10 are sections at the lines 9—9 and 10—10 respectively on Fig. 8;

Fig. 11 is a sectional elevation of the mold opening and closing mechanism;

Fig. 12 is a sectional plan of the same at the line 12—12 on Fig. 11;

Fig. 13 is a section at the line 13—13 on Fig. 12;

Fig. 14 is a section at the line 14—14 on Fig. 3 showing mechanism for moving a slide radially inward on the work table when a work-piece has been placed thereon;

Fig. 15 is a section at the line 15—15 on Fig. 14; and

Fig. 16 is a section at the line 16—16 on Fig. 3, of mechanism similar to that shown on Fig. 15 but designed for moving a slide radially outward.

The machine comprises in general a carriage mounted for rotation about a central stationary column or shaft 20, the carriage including a main work supporting table 21, a press mold table 22, an annular series of press molds 23, and mechanisms 24 individual to the press molds for opening and closing them under the control of a stationary cam 25. Mounted on the table 21 are slides 26 extending radially of the table and carrying elevators 27, each adapted to support a work-piece or bowl 28 of the article being formed and operable to lift the bowl into position within the press mold 23 for attachment of the stem thereto. Means are provided for moving the slides 26 radially outward into position for receiving and discharging the work-piece.

Figure 1:
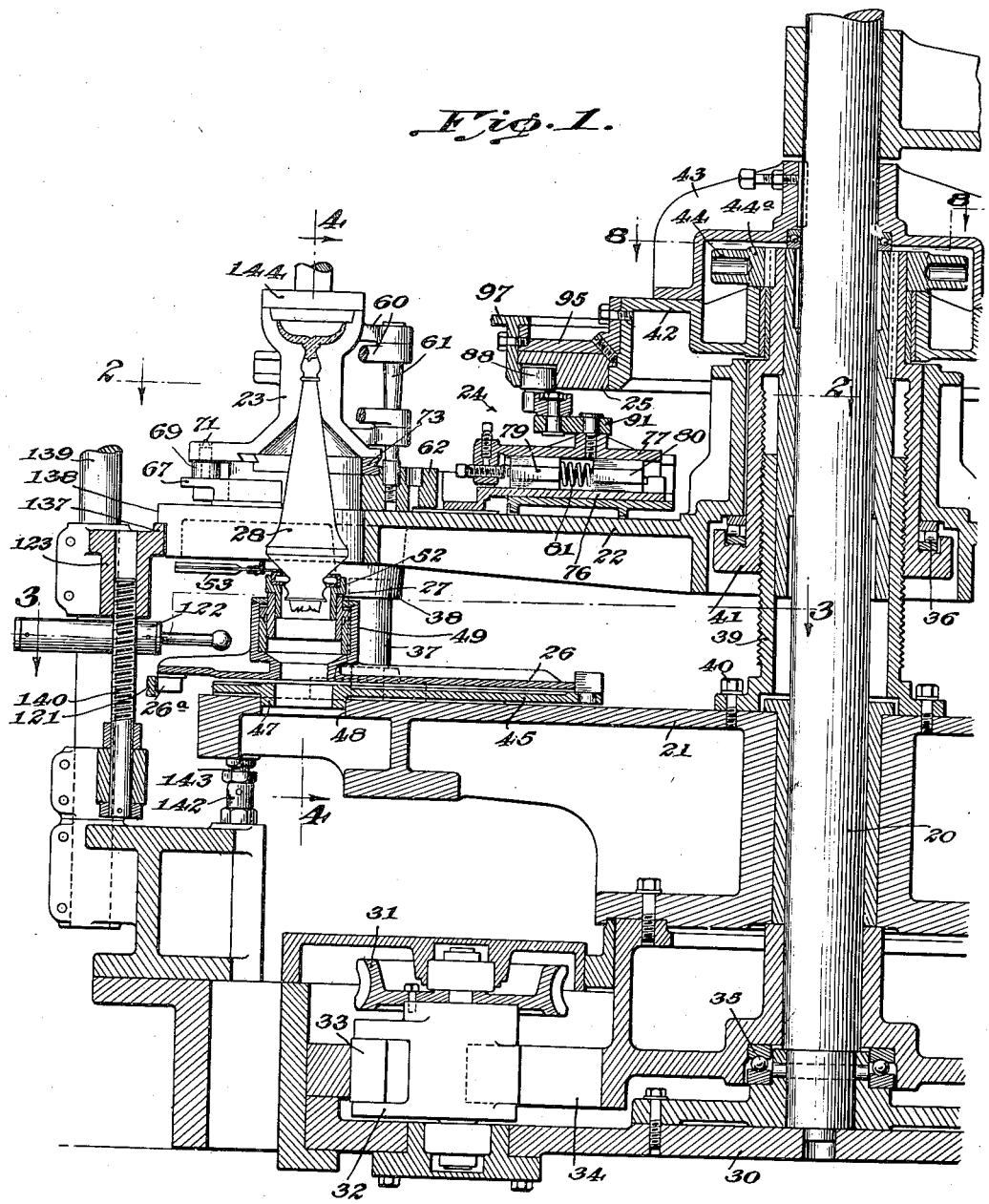
Fig. 1 is a fragmentary sectional elevation of the machine.

The center column 20 is supported on a base 30 (Fig. 1) on which is also mounted driving mechanism for imparting an intermittent step by step rotation to the carriage. Said driving mechanism is conventional, being used, for example, in Lynch type machines. It includes a worm wheel 31 continuously driven by an electric motor and operating through a Geneva drive to rotate the carriage. Said Geneva drive includes a driving element 32 connected to rotate with the worm wheel and carrying a roll 33 which at each rotation of said element, engages a Geneva gear 34 bolted to the carriage, for imparting a step rotation to the latter. The work table 21 is supported on ball bearings 35. The mold table 22 is supported on bearings 36 and is driven by means of driving elements in the form of posts 37 rising from the table 21 and which engage behind lugs or blocks 38 on the lower side of the mold table 22. Each mold group is brought to the stop positions or stations $a$ to $l$ (Fig. 8) in succession by the step movements of the carriage.

Mechanism is provided for adjusting the mold table 22 up and down relative to the table 21, which permits all of the press molds and their operating parts to be raised or lowered at the same time to suit various lengths of bowls or articles which are being made, thereby eliminating the usual adaptors. Such mechanism includes an inner sleeve member 39 attached by bolts 40 to the table 21 and having exterior screw threads engaging an interiorly threaded outer sleeve member 41 which carries the roller bearings 36 supporting the mold table 22. The sleeve member 41 has bearings at its upper end in a stationary plate or spider 42 supported by brackets 43 attached to the center column 20. Keyed to the upper end of the sleeve 41 is a ring 44ª formed with sockets 44 to receive a socket wrench for rotating the sleeve 41 and thereby adjusting the mold table up or down.

The mechanism for supporting the work-pieces on the table 21 includes slides 26 (Figs. 1, 3 and 4) arranged in an annular series and extending radially of the machine. Each slide is mounted for radial movement in a pair of guideways provided by a plate 45 and guide rails 46 bolted thereto. The plate 45 is formed on its lower side with an annular boss 47 which fits in an opening 48 in the table, thereby holding the plate in position while permitting it with the work-holder thereon readily to be removed. The slide plate 26 is formed with a cylindrical casing 49 in which is mounted the elevator 27 for lifting and lowering the work-piece 28 as hereinafter described. The elevator includes an upper ring 50 supported on a lower ring 51. A holder 52 which seats on the elevator ring 50 is adapted to receive the snaps 53 in which the bowl 28 is gripped. The elevator ring 50 is formed with an exterior flange having spiral bearing surfaces 55 to seat on correspondingly shaped bearing surfaces 54 (Fig. 6) of the supporting ring 51.

The ring 51 is mounted for oscillating movement within the case 49 and has attached thereto an arm 56 which extends through an elongated slot 57 in the wall of the case 49. Means are provided as hereinafter described for engaging the arm 56 and rotating the ring 51, thereby camming the elevator ring 50 upwardly. This serves to move the bowl 28 upward so that its upper end fits snugly within the mold cavity and is held in such position while the stem is attached thereto. The elevator ring 50 is held against rotation by a lug 58 mounted on the casing 49 (Fig. 4) engaging a notch 59 (Fig. 5) in the ring.

Figure 2:
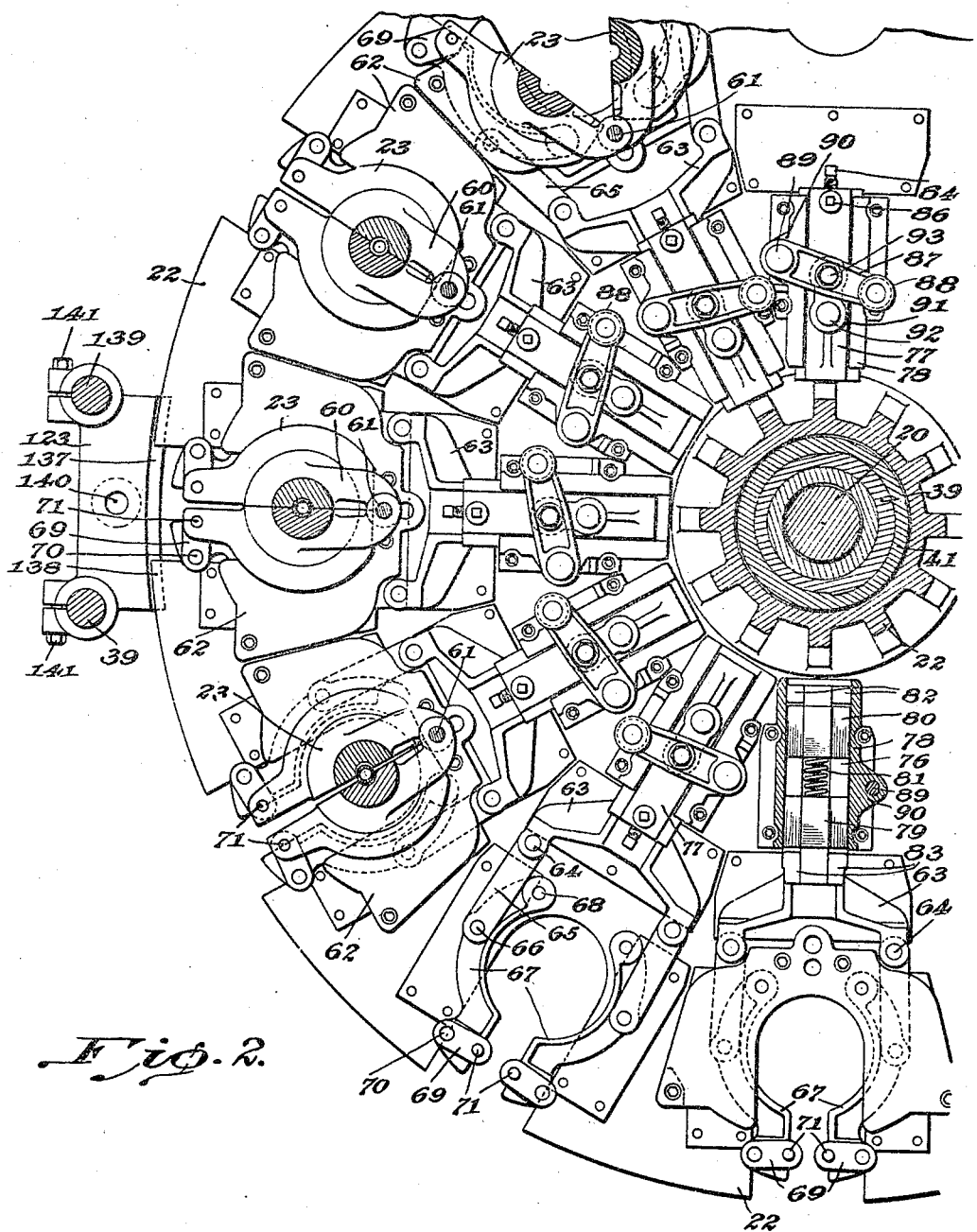
Fig. 2 is a sectional plan view of the same, the section being taken at the line 2—2 on Fig. 1.

The press molds 23 (Figs. 1, 2 and 4) each comprises a pair of mold sections carried on arms 60 which swing about a vertical pivot pin 61 attached to a plate 62 mounted on the table 22. Means for opening and closing the mold includes a yoke 63 connected by pivots 64 to links 65. The outer ends of the links 65 are pivoted at 66 to a pair of mold gripping arms 67, the latter being pivoted at 68 to the mold table. Links 69 pivoted at 70 to the forward ends of the arms 67 carry pins 71 which engage sockets in the forward ends of the mold sections. The yoke 63 is mounted for radial movement and when moved outwardly operates through the linkage just described to close the mold.

A U-shaped member 73 (Figs. 4 and 7), referred to as a ring, is attached to the plate 62 by bolts 74 and is formed with a dove-tail groove 75 extending circumferentially along its outer surface to receive correspondingly shaped ribs formed on the mold sections. This serves as a centering device for the press mold. It also holds or clamps the mold down on the plate 62, thereby preventing it from rising when the bowl 28 is pushed upward into the mold by the elevator ring 50 preliminary to the introduction of the charge of glass into the mold for forming the stem and foot. The ring 73 further prevents the mold from tipping over while the mold table is rotating.

The stationary cam 25 operates through the following mechanism to reciprocate the yoke 63 for opening and closing the mold. Referring to Figs. 1, 2 and 11 to 13, a pair of slide bars including a lower slide bar 76 and an upper slide bar 77 are mounted for sliding movement radially of the mold table in a guiding frame 78 secured to the table. The lower slide bar 76 is formed integral with the yoke 63. The two slide bars are spaced apart vertically and shaped to provide a guideway in which slide blocks 79 and 80 are mounted, said blocks being formed with sockets to receive the ends of a coil spring 81 which may be placed under compression between the blocks. The lower slide plate 76 is formed at its inner end with stop lugs 82 which project upward behind the block 80. The outer slide block 79 engages stop lugs 83 formed on the yoke 63. The upper slide plate 77 is formed at its inner end with depending lugs 77ª which engage behind the block 80. The plate 77 carries at its outer end a stop screw 84 in the path of a stop 85 in the block 79. The stop screw 84 is adjustable and held in adjusted position by a set screw 86.

Movement is imparted to the upper slide plate 77 through a lever 87 carrying a cam roll 88 on one end thereof running on the cam 25. The other end of the lever is mounted on a pivot pin 89 mounted on a lug 90 on the guide frame 78. A link 91 connected at one end by a pivot pin 92 to the slide plate 77 and connected at its other end by a pivot pin 93 to the lever 87, provides an operating connection between the lever and the slide plate.

The cam 25 includes a section 25ª (Fig. 8) for opening the molds, a section 25ᵇ for holding them open, a section 25ᶜ for closing the molds, a section 25ᵈ for holding the molds closed under spring pressure, a section 25ᵉ for slightly opening or "cracking" the molds, a section 25ᶠ which retains the molds open without spring pressure, and sections 25ᵍ which provide double cam tracks and which serve selectively for holding the molds either open or closed as hereinafter described.

When the cam roll 88 engages the section 25ᶜ, it is moved radially outward and operates through the mechanism 24 (Figs. 11 to 13) to close the mold. The outward movement of the cam roll operates through the lever 87 and link 91 to move the upper slide 77 outward. This causes the lugs 77ª to move the slide block 80 which in turn operates through the spring 81 to move the outer slide block 79 and through the lugs 83 to move the yoke 63 outward, thereby closing the mold as heretofore described. It will be seen that the cam thus operates through the coil spring 81 to close and hold the mold closed with a spring pressure.

When the cam roll 88 engages the cam section 25ª and is drawn radially inward, it operates through the lever 87 to move the upper slide plate 77 inwardly, causing the stop screw 84 to engage the stop 85, move the block 79 inwardly and through the coil spring, block 80 and lugs 82, move the lower slide plate 76 and yoke 63 inwardly for opening the mold.

By reference to Fig. 8 it will be seen that the portion of the cam track comprising the section 25ᵈ is positioned radially outward a somewhat greater distance from the center of the machine than the sections 25ᶠ and 25ᵍ, thus permitting the molds after being closed by the section 25ᶜ to be held tightly closed under spring pressure. After passing the mold cracking section 25ᵉ, the molds are again fully closed, but are held closed with comparatively slight pressure applied through the spring 81 while the cam roll travels along the sections 25f and 25g.

The cam sections are removably, adjustably and in part interchangeably mounted on the cam plate 42, by means of the construction shown in Figs. 8 to 10. This comprises an annular plate or ring 95 surrounding the plate 42, said ring having an inner vertical flange 95a secured by bolts 96 to the plate 42. An outer ring 97 made in separate halves or sections is removably attached by bolts 98 to the ring 95. The cam sections are held in position between the plate 42 and ring 97 and are clamped in place by corner set screws 99 threaded through the ring 95 and into the cam sections. The cam sections are for the most part of a length corresponding to the angular distance through which the mold carriage is advanced during each step movement, the ends of the cam sections abutting along radial lines 99a (Fig. 8).

The cam sections 25g are formed to provide an outer cam track 25h and an inner cam track 25i separated by a wall 100 or flange formed on the cam sections. It will be seen that with the cam sections arranged as shown in Fig. 8, the double cam track and partition wall 100 extend from the section 25f to the section 25a, and include the stations f to k. With the arrangement shown, the cam roll 88 travels in the outer cam track 25h while traversing said stations. In this manner the molds are held closed through a comparatively long period of time. However, the cam section 25a, which serves to open the molds, may be placed interchangeably between any two of the cam sections 25g or may be placed at station f to adjoin the section 25f. By removing the outer ring 97 or one-half thereof, any desired cam section may then be removed by first loosening its holding screw 99. The cam sections may also be slidably adjusted circumferentially of the cam plate by first loosening the holding screws 99. In this manner the section 25a may be removed and then one or more of the sections 25g advanced toward the section 25b and the section 25a then placed in the gap thus provided. After such rearrangement of the cam sections, the cam roll will be directed by the section 25a into the inner cam track 25i. This inner track, which now registers with the section 25b, holds the molds in open position while the cam roll traverses the inner track. This means of adjustment permits the molds to be opened at any desired station within the range of adjustment, depending upon the requirements of the particular article which is being formed in the mold.

The mechanism for moving the slides 26 radially inward after receiving the work-piece, will now be described. Such mechanism (Figs. 14 and 15) includes an air operated piston motor 105 mounted on trunnions 106. The motor piston 107 is pivoted at 108 to a lever or rock arm 109. The arm 109 is mounted to swing about a pivot 110 at its lower end. The upper end of the arm is connected through a link 111 to a lug formed on the lower side of a slide block 112 mounted to reciprocate in guides 113 carried on a framework 114.

A bifurcated arm 115 is connected by a pivot pin 116 to the slide block 112. The arm 115 is normally held in its upright position by a coil spring 117, in which position it is adapted to engage a lug 26a on the outer end of the slide 26 when the carriage is at rest. The pivotal mounting of said arm permits it to swing to one side if it should be brought accidentally in the path of the slide while the latter is rotating with the carriage as, for example, upon failure of the motor 105 to move the slide block 112 to its outermost position.

Each step movement of the carriage brings a slide 26 into line with the arm 115. The piston motor then operates to swing the lever 109 from the full line position to the broken line position (Fig. 14), thereby moving the slide block 112 inward and through the arm 115 moves the slide 26 inwardly. The bowl 28 carried on the slide is thus positioned between the open sections of the press mold. The motor 105 immediately reverses and projects the slide block 112 to its outward position.

The mechanism for moving the slides 26 outward is substantially identical with that just described and shown in Figs. 14 and 15 including the motor 105 and operating connections for moving the slides inward, except that the slide block 112a, (Fig. 16), which reciprocates in a frame 114a, is of somewhat different construction. In this instance the slide block is formed with a projection 118 arranged to engage behind the lug 26a on the slide 26. The operation of the motor which moves the slide outward is also the reverse of that above described for moving the slide 112 inward. That is to say, the outward movement of the slide 26 is effected by an outward stroke of the motor piston rod followed immediately by an inward idle stroke.

The slides 26 are prevented from accidentally moving outward beyond their normal projected position (Fig. 3) by means of a stationary guard rail 120 mounted on the frames 114, 114a. The rail is positioned at the level of the slides and provides an abutment for the outer ends of the slides as they advance with the carriage. A stationary guide rail 121 extending circumferentially of the carriage serves a like purpose while the slides 26 are in their retracted position, the rail preventing the slides from being moved outwardly by centrifugal force or from being accidentally projected due to any other cause.

The elevator 27 is automatically actuated for lifting the bowl 28 while the latter is supported at the station c (Fig. 3). The means for actuating the elevator comprises a piston motor 122 which has a stationary mounting on a frame 123. The piston rod 124 of the motor is in line with the arm 56 when the elevator is at station c. The motor now operates to project the piston rod which engages the arm 56 and moves it from the dotted line position to full line position, thereby rotating the elevator ring 51 (Fig. 4) and lifting the bowl 28 preparatory to the pressing operation. The piston rod 124 is immediately withdrawn after its operating stroke. The elevator remains in its lifted position until it reaches the station l at which the slide carrying the finished article is projected.

The elevator is automatically lowered during the outward movement of the slide at station l by means of an arm 125 mounted on the mold table and projecting into the path of an arm 126 attached to the elevator ring 51 diametrically opposite from the arm 56. The arm 125 is carried on a rock shaft 127 to which is also secured an arm 128 held against a stop screw 129 by means of a light coil spring 130. It will be seen that with this construction the arm 125 operates positively to rotate the elevator ring as the slide 26 moves outward at station l. When the slide is retracted at station a and strikes the arm 125, the latter is rocked and permits the elevator to pass without being lowered.

A safety device (Figs. 3 and 15) is provided for stopping the machine or preventing the mold carriage from indexing in the event that the slide 26 at the station a is not fully retracted before the mold carriage commences its rotation. This safety device comprises a bar 131 positioned directly in advance of the projected slide 26, said bar being attached to rock arms 132 on a rock shaft 133 mounted on the frame 114. A link 134 connects the rock arms 132 with an arm 135 of a control device 136, herein shown as a valve, for controlling the motor which drives the carriage. If the slide 26 at station a is not fully retracted before the carriage commences its movement, it engages the bar 131 and operates through the mechanism just described for actuating the control device 136 and stopping the motor which drives the carriage.

The frame 123 (Figs. 1, 2 and 3) is formed with a marginal rib 137 which projects beneath a shoulder 138 formed on the periphery of the mold table 22. This provides a support for the mold table during the pressing operation. The frame 123 is mounted on a pair of vertical posts 139 fixed to the machine frame. An adjusting screw 140 provides means for adjusting the frame 123 up and down. Clamping screws 141 serve to clamp the frame 123 in its adjusted position.

The work table 21 is supported in a similar manner by a stud 142 mounted on the machine frame in position to register with a lug 143 (Figs. 1 and 14) adjustably mounted on the under surface of the work table.

The operation of the machine will be understood from the preceding description but may be summarized as follows: While the mold carriage is at rest, a bowl 28 carried by the snaps 53 (Fig. 4) is manually placed in the holder 52 at station l (Fig. 3), the slide 26 with said holder being in its projected position. The mold carriage is now indexed by the Geneva drive, bringing the holder with the bowl 28 to station a. The piston motor 105 (Fig. 14) then operates while the carriage remains at rest to move the slide 26 radially inward, carrying with it the bowl 28. The carriage now rotates another step and brings the bowl to station b. During this rotation the cam section 25ᶜ operates to close the press mold 23 around the upper end of the bowl 28. At station b a charge of glass is dropped into the mold by an automatic feeder (not shown). The carriage is again indexed, bringing the work-piece to station c. Here the motor 122 (Fig. 3) operates the elevator to lift the workpiece into snug engagement with the closed mold. A mold grip (not shown) now locks the mold closed and a press plunger 144 (Figs. 1 and 4) descends and molds the foot and stem, at the same time pressing the stem onto the bowl. The mold grip then releases the mold, allowing the table to again index. As the mold advances beyond station c, it is cracked by the section 25ˡ, then closed. As the cycle of movement continues, the mold remains closed, drawing heat from the stem and foot. The length of this time is variable depending on the position at which the cam section 25ᵃ has been placed. When this cam section is reached, it operates to open the mold. The work-piece may be removed at any time after the mold is opened but preferably at the station l after the slide carrying the work-piece has been projected outward. The elevator is lowered as before described by the outward movement of the slide 26 at station l. Although the operation has been described in connection with the formation of a single article, it will be understood that each unit as it reaches the loading station a has a work-piece or bowl 28 placed thereon so that a number of articles corresponding to the number of molds or units are in process of fabrication concurrently.

Modifications may be resorted to within the spirit and scope of my invention.

I claim:

1. Apparatus for fabricating glass articles comprising, in combination, a work-holder for supporting a work-piece of plastic glass, an elevator in which the holder is supported, a press mold positioned above the said holder, automatic means for bringing the press mold into register with the holder, said elevator comprising relatively rotatable sections formed with cooperating cam surfaces, and means dependent on said registration of the press mold and holder and automatically operated at a predetermined time after such registration, to rotate one said section and thereby elevate the said work-piece holder.

2. Apparatus for fabricating glass articles comprising, in combination, a work-holder for supporting a work-piece of plastic glass, an elevator in which the holder is supported, a press mold positioned above the said holder, automatic means for bringing the press mold into register with the holder, said elevator comprising an upper section on which the said work-holder is carried and a lower section, said lower section formed with a cam surface, and means dependent on said registration of the press mold and holder and automatically operated at a predetermined time after such registration, to rotate the lower section and thereby cam the work-holder upward.

3. Apparatus for fabricating glass articles comprising a work-table, means for rotating it about a vertical axis, an elevator carried on said table, a work-holder carried on said elevator, a motor having a stationary mounting, said motor positioned and arranged to actuate said elevator when the latter is brought to a predetermined position by the rotation of the work-table.

4. The combination of a work-table, means for rotating it, a slide mounted on said table for movement radially thereof, an elevator carried on the slide, a work-holder carried on the elevator, means for actuating the elevator while the slide is in its retracted position and thereby elevating the work-holder, and means actuated by the outward movement of the slide to reverse the elevator and thereby lower the work-holder.

5. Apparatus for fabricating glass articles comprising a carriage including a work-table, means for rotating the carriage intermittently step by step, a slide mounted on said table for reciprocating movement radially thereof, a work-holder carried on the slide, and mechanism for reciprocating the slide, said mechanism including a piston motor, a stationary frame having a stationary guideway extending radially of the work-table, a slide block movable in said guideway and positioned to operate said slide, and operating connections between said motor and said slide block.

6. The combination of a work-table, means for rotating it about a vertical axis, a slide mounted on the table for reciprocation radially thereof, a work-holder carried on the slide, and means for actuating the slide comprising a piston motor, a slide block, a stationary frame having slideways extending radially of the work-table and in which said slide block is mounted for reciprocation, and operating connections between said slide block and the motor.

7. The combination of a work-table, means for rotating it about a vertical axis, a slide mounted on the table for reciprocation radially thereof, a work-holder carried on the slide, and means for actuating the slide comprising a piston motor, a slide block, a stationary frame having slideways extending radially of the work-table and in which said slide block is mounted for reciprocation, operating connections between said slide block and the motor, an arm pivotally mounted on said slide block, and a spring for holding said arm in an operative position for engaging the slide on the work-table.

8. Apparatus for fabricating glass articles, comprising a work-table, power transmitting mechanism geared to the work-table for rotating it about a vertical axis, an elevator carried on said table and rotatable therewith, a work-holder carried on said elevator, and automatic means for actuating said elevator and thereby lifting the work-holder when the latter is brought to a predetermined position by the rotation of the work-table.

9. Apparatus for fabricating glass articles, comprising a work-table rotable about a vertical axis, power transmitting mechanism geared to the work-table for rotating it, an elevator carried on said table and rotatable therewith, a work-holder carried on said elevator, and a device mounted separately from the work-table and operable automatically to actuate said elevator and thereby lift the work-holder when the latter is brought to a predetermined position by the rotation of the work-table.

HAROLD R. SCHUTZ.